United States Patent [19]

Andersson et al.

[11] Patent Number: 5,706,871

[45] Date of Patent: Jan. 13, 1998

[54] FLUID CONTROL APPARATUS AND METHOD

[75] Inventors: Bo-Göran Andersson, Austin, Tex.; Bengt Ingamar Larsson, Skivarp, Sweden

[73] Assignee: Dresser Industries, Inc., Dallas, Tex.

[21] Appl. No.: 515,484

[22] Filed: Aug. 15, 1995

[51] Int. Cl.⁶ ............................................. B65B 31/00
[52] U.S. Cl. .................... 141/59; 141/4; 141/45; 141/47; 141/104; 141/285; 141/302; 137/486; 137/625.41
[58] Field of Search ............................... 141/4, 45, 47, 141/59, 104, 105, 186, 192, 196, 285, 290, 302; 137/486, 625.41; 128/200.19; 251/325

[56] References Cited

U.S. PATENT DOCUMENTS

| | | | |
|---|---|---|---|
| 4,057,086 | 11/1977 | Healy | 141/206 |
| 4,095,626 | 6/1978 | Healy | 141/206 |
| 4,118,170 | 10/1978 | Hirt | 431/5 |
| 4,508,127 | 4/1985 | Thurston | 137/8 |
| 4,915,132 | 4/1990 | Hodge et al. | 137/625.41 |
| 4,949,755 | 8/1990 | Thurson et al. | 137/833 |
| 5,040,577 | 8/1991 | Pope | 141/59 |
| 5,083,744 | 1/1992 | Reinicke et al. | 137/486 |
| 5,101,862 | 4/1992 | Leete | 137/486 |
| 5,127,173 | 7/1992 | Thurston et al. | 73/202 |
| 5,194,075 | 3/1993 | Matsuoka | 55/195 |
| 5,269,353 | 12/1993 | Nanaji et al. | 141/59 |
| 5,280,814 | 1/1994 | Stroh | 141/59 |
| 5,305,807 | 4/1994 | Healy | 141/59 |
| 5,323,817 | 6/1994 | Spalding | 141/59 |
| 5,332,008 | 7/1994 | Todd et al. | 141/5 |
| 5,332,011 | 7/1994 | Spalding | 141/59 |
| 5,377,718 | 1/1995 | Sand | 137/625.41 |
| 5,477,884 | 12/1995 | Barkes | 137/625.41 |

*Primary Examiner*—Henry J. Recla
*Assistant Examiner*—Timothy L. Maust
*Attorney, Agent, or Firm*—Haynes and Boone, L.L.P.

[57] ABSTRACT

A fluid control apparatus and method in which a valve unit having a plurality of inlets is respectively connected to multiple fluid sources and an outlet. A unit containing a flowmeter is also provided which cooperates with the valve unit in a manner so that, upon rotation of one of the units relative to the other, the flow of fluid is controlled from the selected fluid source to the valve unit outlet. The flowmeter is adapted to measure variations in the flow rate of the fluid, and the flow of the fluid is controlled in response to one or more related parameters.

65 Claims, 5 Drawing Sheets

FLUID CONTROL APPARATUS AND METHOD

BACKGROUND OF THE INVENTION

This invention relates to a fluid control apparatus and method and, more particularly, to such apparatus and method for controlling the flow of fluids from multiple sources.

The need for controlling the flow of fluids from multiple sources is widespread, especially in the chemical and petroleum industries. For example, a number of systems have been proposed for providing different grades of gasoline for refueling vehicles at a service station, or the like, while also controlling the flow of hydrocarbon vapors displaced from the tank during the refueling operation.

Previous gasoline dispensing and recovery systems of this type have included a plurality of dispensing nozzles at each dispensing area of the station, with each nozzle being adapted to dispense a different grade of gasoline. Passages are provided in each nozzle for collecting vapors from the fuel tank, and a vapor return line communicates the vapor passage for delivering the collected vapors to the underground fuel storage tank. Although these designs have been generally successful in recovering a portion of the vapors, they are not without problems.

For example, some of the earlier systems relied solely upon vapor pressure within the fuel tank to force the vapor through the vapor return line. However, due to pressure losses and partial obstructions in the vapor recovery line (sometimes caused by fuel splashback or condensation), the vapor pressure developed in the vehicle fuel tank was often insufficient to force the vapor out of the vehicle tank and to the underground storage tank.

Other, more recent, vapor recovery systems employ a vacuum pump for drawing vapor from the vehicle tank and through a vapor return line. To avoid the expense of a separate vacuum pump at each dispensing station, such systems have typically resorted to a powerful, continuously-operating vacuum pump and a complicated arrangement of electrically actuated valves for connecting the various vapor return lines to the vacuum pump when the various pumps were actuated for dispensing. Acceptance of these designs has been minimal because of the expense and difficulty of both installation and maintenance. Additionally, since they typically draw such a large volume of ambient air relative to the volume of fuel vapor, there is a danger of an explosive mixture being formed.

Also, it has been suggested that each dispensing unit include a vacuum pump driven by the dispensing unit's conventional gasoline flow meter and connected to a vapor return line. However, this type of apparatus is limited to a linear relationship between gas flow and vapor flow, which relationship is not always optimum, since the vapor concentration in the return line is dependent on several parameters such as nozzle design, vehicle fill pipe design, weather conditions, wind, vehicle fuel tank temperature, fuel temperature atmospheric pressure, etc. In apparatus designed to correct for this, a valve has been provided which is controlled by electronics that respond to the gasoline and the vapor flow and establish an optimum relationship therebetween. However, this requires a metering device and a control valve for each dispensing nozzle, which is expensive and results in an unduly complicated apparatus. Moreover, in the latter arrangements, the vapor metering device is disposed downstream of its associated control valve. Therefore, when the vapor expands after leaving the control valve, it causes the operation of the metering device to be less than optimum.

SUMMARY OF THE INVENTION

It is therefore an object of the present invention to provide a fluid control apparatus and method in which one meter/valve assembly controls and meters the flow of the fluid from multiple sources.

It is a further object of the present invention to provide an apparatus and method of the above type in which the metering takes place upstream of the fluid control.

It is a still further object of the present invention to provide as apparatus and method of the above type in which the amount of fluid flow can easily be adjusted in response to various parameters.

It is still a further object of the present invention to provide an apparatus and method of the above type for use in a gasoline dispensing and vapor recovery system in which a single vapor pump serves a plurality of gasoline dispensing nozzles for selectively drawing vapor from vehicle tanks during the dispensing of gasoline into the tanks.

It is still a further object of the present invention to provide an apparatus and method of the above type in which the fluid or vapor flow can be controlled in response to several parameters such as nozzle design, vehicle fill pipe design, weather conditions, wind, vehicle fuel tank temperature, fuel temperature, atmospheric pressure, etc.

Towards the fulfillment of these and other objects, according to the apparatus and method of the present invention, a valve unit having a plurality of inlets is respectively connected to multiple fluid sources and an outlet. A unit containing a flowmeter is also provided which cooperates with the valve unit in a manner so that, upon rotation of one of the units relative to the other, the flow of fluid is controlled from the selected fluid source to the valve unit outlet. The flowmeter is adapted to measure variations in the flow rate of the fluid, and the flow of the fluid is controlled in response to one or more related parameters.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
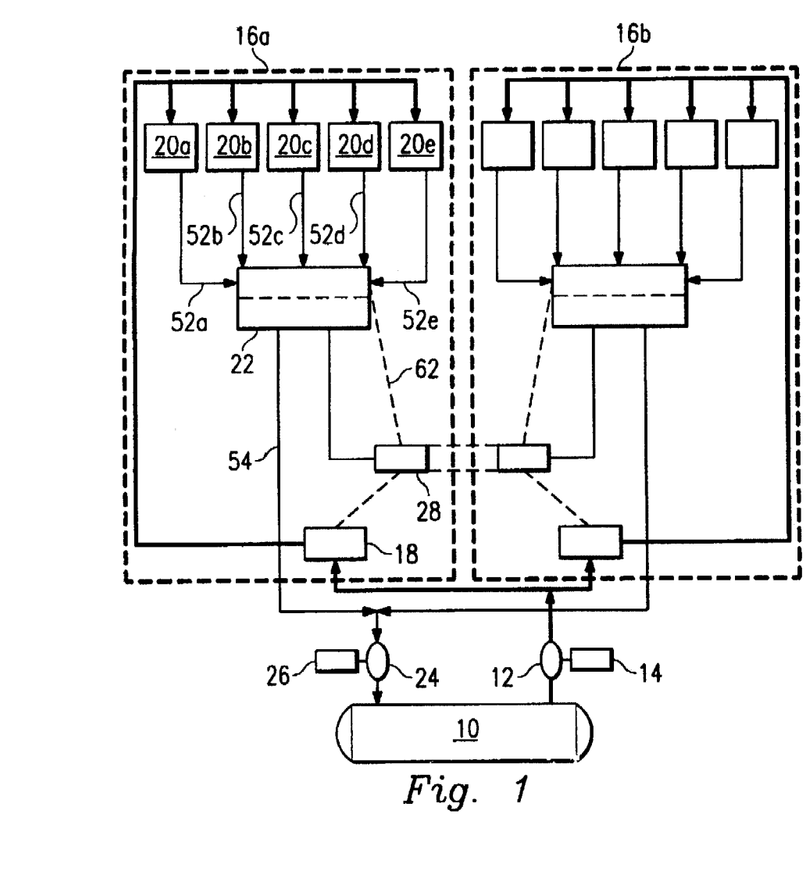
FIG. 1 is a schematic view of the apparatus of the present invention.

Referring to FIG. 1 of the drawings, the fluid control apparatus and method of the present invention will be described, by way of example, in connection with gasoline dispensing and vapor recovery at a vehicle service station. The reference numeral 10 refers to an underground gasoline storage tank, which is connected by a suitable conduit to a pump 12 driven by a motor 14 for pumping the gasoline to two dispensing stations 16a and 16b respectively represented by the dashed lines in the drawing. Since the stations 16a and 16b are identical, only the station 16a will be described in detail. A gasoline flow meter 18 receives the gasoline from the pump 12 and generates an output signal in proportion to the gasoline flow, for reasons to be described.

The dispensing station 16a includes five dispensing units 20a–20e for five different types or grades of gasoline and since the units are conventional, they are shown only schematically in the drawing. It is understood that each unit 20a–20e includes a dispenser housing for containing the necessary gasoline dispensing and vapor recovery components, including those to be described. Also, a blending chamber or valve can be included to regulate the volumetric ratio of a relative low octane products, such as unleaded regular, and relatively high octane products, such as unleaded premium, so as to make available multiple grades of fuel. In this context, although only one storage tank 10 is shown in the drawings, it is understood that two or more tanks would be provided, each containing a different grade or type of fuel, and that proper valving would be included to pass the two or more fuels to the above-mentioned blending chamber or valve. This blending technique does not form a part of the present invention and is disclosed in U.S. Pat. Nos. 3,424,348; 3,838,797 and No. 4,049,159, all of which are hereby incorporated by reference.

Although not shown in the drawings, it is understood that each unit 20a–20e also includes a hose and nozzle assembly which includes a twin hose arrangement of either two separate hoses or a coaxial arrangement in which inner and outer hoses are connected to a single dispensing nozzle for dispensing the blended product through one of the hoses and for receiving vapor from the vehicle tank in the other hose.

The station 16a also includes a meter/valve assembly 22 which is selectively connected to each of the units 20a–20e. As will be described in detail later, the assembly 22 includes a valve unit and a member which cooperates with the valve unit to control the fluid flow through the assembly and which contains a flowmeter. The vapor is forced from the vehicle tank by the gasoline entering the tank and passes through the vapor recovery hose associated with the selected unit 20a–20e, and through the assembly 22. A vacuum pump 24 is connected between the unit 22 and the storage tank 10 for assisting in returning the captured vapors to the tank. The pump 24 is conventional and is driven by a motor 26.

It is understood that suitable piping, conduits, valves, and the like, can be provided to accommodate the above described gasoline flow, which is shown by the relatively heavy lines in FIG. 1, and the vapor flow, shown by the relative light lines.

A control unit 28 is provided in association with both of the stations 16a and 16b, receives electrical input signals from the gasoline flow meter 18 and from the assembly 22, and generates an output signal which is transmitted to the valve portion of the assembly 22 to operate the assembly, all in a manner to be described. The electrical connections between the control unit 28 and the meter 18 and the assembly 22 are shown by dashed lines in the drawing.

It should be emphasized that since FIG. 1 is merely a schematic representation of the basic components of the assembly of the present invention, the exact location of the components can vary within the scope of the invention. For example, the vapor pump 24 and the motor 26 are not necessarily located adjacent the storage tank 10 but could be located in the dispensing station 16a.

Figure 2:
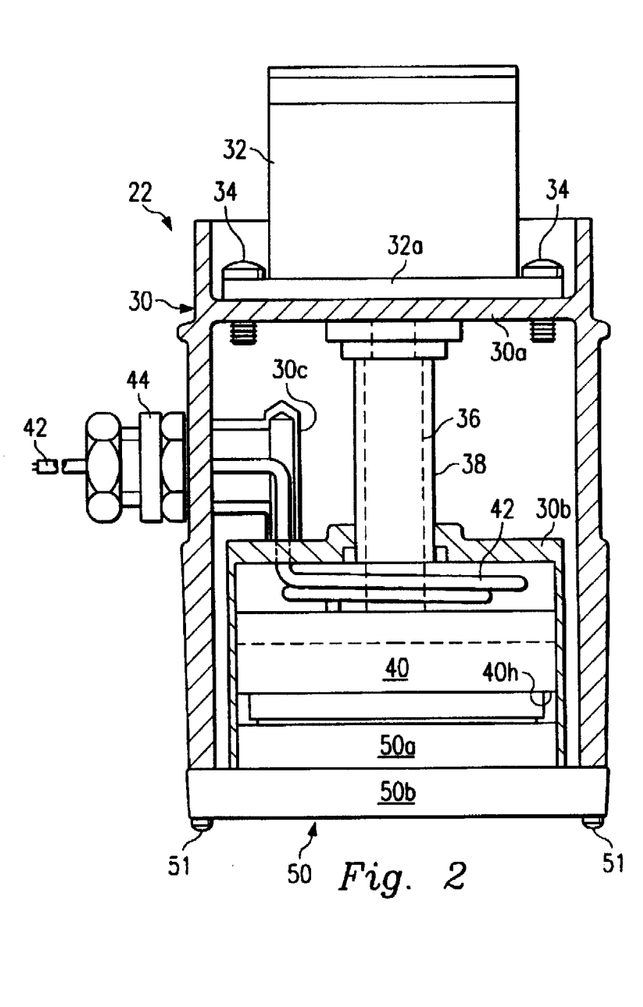
FIG. 2 is a sectional view of a meter/valve assembly forming a portion of the apparatus of FIG. 1.

The meter/valve assembly 22 is shown in FIG. 2 and includes a housing 30 having a platform 30a formed therein. A stepper motor 32 extends through the top of the housing 30, has a base portion 32a which rests on the platform 30a and is attached to the housing by four threaded bolts, two of which are shown by the reference numeral 34. A drive shaft 36 extends downwardly from the motor 32, as viewed in FIG. 2, and through the upper wall of a subhousing 30b formed in the lower portion of the housing 30. The drive shaft 36 extends within, and is supported by, a tubular support member 38 which also extends from the motor 32 and through the upper wall of the subhousing 30b.

A disc-like, body member 40, having a stepped outer diameter, is disposed in the subhousing 30b. The distal end of the output shaft 36 is connected to the center portion of the member 40 and a planetary gear, or the like (not shown), is provided for rotating the drive shaft 36 in response to actuation of the motor 32 in a conventional manner, with this rotation causing corresponding rotation of the member 40.

An electrical signal-conducting cable 42 extends from the member 40, through the upper wall of the subhousing 30b, through a molded conduit 30c formed in the housing 30 and through the wall of the latter housing. A stress-relieving nut assembly 44 is provided on the outer portion of the wall of the housing 30 which receives and protects the cable 42. The cable 42 is connected to the control unit 28 (FIG. 1) to pass signals relating to the flow of the fluid to the control unit 28 for reasons to be described. Although not shown in the drawings it is understood that an electrical signal-conducting cable also connects the output of the control unit 28 to the motor 32 to drive same as also will be described. A disc-like valve unit 50 is disposed in the subhousing 30b immediately below, and in a coaxial relationship with, the member 40. The unit 50 has an enlarged base portion 50b which is affixed to the lower end of the housing 30 by a series of bolts 51 (two of which are shown in FIG. 2) which extend through aligned openings in the base portion 50b and the housing 30. Thus, the member 40 rotates relative to the fixed valve unit 50 with the arrangement being such that this rotation controls the flow of fluid through the assembly 22 in a manner to be described.

Figure 3:
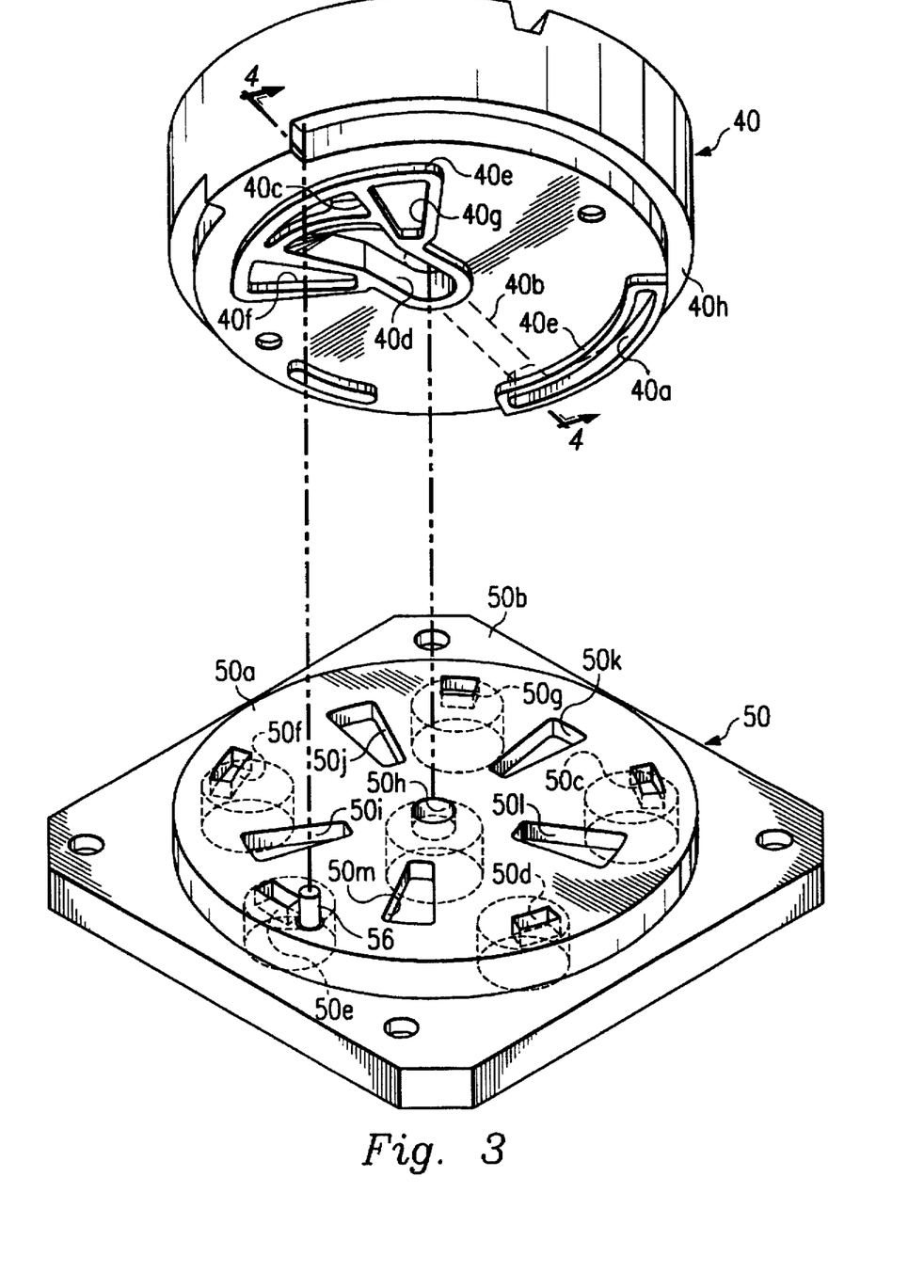
FIG. 3 is an exploded, perspective view of the meter/valve assembly of FIG. 2.

FIG. 3 better depicts the relationship between the member 40 and the valve unit 50. More particularly, the valve unit 50 has a series of five through ports 50c–50g which extend through the body member 50 and which serve as inlets. The inlet ports 50c–50g are angularly spaced around the body member 50a and, as shown in FIG. 1, are connected to the dispensing units 20a–20e, respectively, by five tubes 52a–52e, which, in turn, are connected to, or form a portion of, the vapor recovery hoses (not shown) respectively associated with the above-mentioned hose and nozzle assemblies of the units 20a–20e.

Referring to FIG. 3, each inlet port 50c–50g extends from the lower surface of the body member 50a, where the port is circular in cross section, to the upper surface of the body member 50a where the port is rectangular in cross section. A through opening 50h extends through the center of the body member 50a and serves as an outlet. The outlet opening 50h is circular in cross section with its diameter being relatively large at the lower surface of the body member 50a and relatively small at its upper surface, and is connected, via a tube 54 (FIG. 1), to the inlet of the vapor pump 24. A series of pie-shaped slots 50*i*–50*m* are also formed in the upper surface of the unit 50 and are angularly spaced around the opening 50*h*. The slots 50*i*–50*m* function in tandem with the ports 50*c*–50*g*, respectively a to allow vapor flow through the member 40 as will be described.

As also shown in FIG. 3, an arcuate, inlet slot 40*a* is provided in the lower surface of the metering member 40 near its outer periphery and is adapted to selectively align with one of the inlet ports 50*c*–50*g* of the valve unit 50 when the units are in their assembled condition and when the assembly is operating. An extended opening is formed at one end portion of the inlet slot 40*a* and registers with one end of a passage 40*b* formed in the interior of the member 40 and extending to an extended opening formed in a pie-shaped slot 40*c* for lower surface of the metering member 40. An elongated slot 40*d* is also formed on the lower surface of the metering member 40 which has one end portion slightly spaced from the slot 40*c*, with the remaining portion of the slot 40*d* extending towards the center of the member 40. The other end of the slot 40*d* registers with the outlet opening 50*h* of the valve unit 50 when the units 40 and 50 are in their assembled condition.

A series of ramps 40*e* are formed on the lower surface of the member 40 and extend around the slots 40*a*, 40*c* and 40*d*. Also, additional ramps 40*e* are provided which define two wedge shaped recesses 40*f* and 40*g* which extend to the respective sides of the slot 40*c*. Each of the recesses 40*f* and 40*g* are thus separated from the slot 40*c* by a ramp 40*e* to prevent fluid leakage as the member 40 rotates relative to the unit 50, as will be described.

A circumferential groove 40*h* is formed on the outer periphery of the member 40 and receives a pin 56 extending from the upper surface of the unit 50 near the opening 50*e*. The groove 40*h* does not extend for the complete circumference of the member 40 and thus has two ends which serve as stops for the pin.

Upon actuation of one of the units 20*a*–20*e* of the dispensing station 16*a*, the basic valving technique made possible by the interaction of the member 40 and the unit 50 involves rotating the member 40 in response to actuation of the motor 32 until the slot 40*a* aligns with the inlet port 50*c*–50*g* corresponding to the selected unit 20*a*–20*e*. This allows the flow of vapor from the selected unit 20*a*–20*e*, through a corresponding tube 52*a*–52*d* and to the corresponding inlet port 50*c*–50*g* of the unit 50. The vapor then flows into the inlet slot 40*a* of the member 40, through the passage 40*b* and to the slot 40*c*. The flow is then allowed to flow over the ramp 40*e* extending between the slots 40*c* and 40*d* and into the latter slot due to the presence of one of the slots 50*i*–50*m* extending over the latter ramp and corresponding to the particular inlet port 50*c*–50*g* selected. From the slot 40*d*, the vapor flows into and through the outlet opening 50*h* of the unit 50 from which it exits the assembly 22 and passes, via the tube 54, to the vapor pump 24 and back to the underground tank 10.

Figure 4:
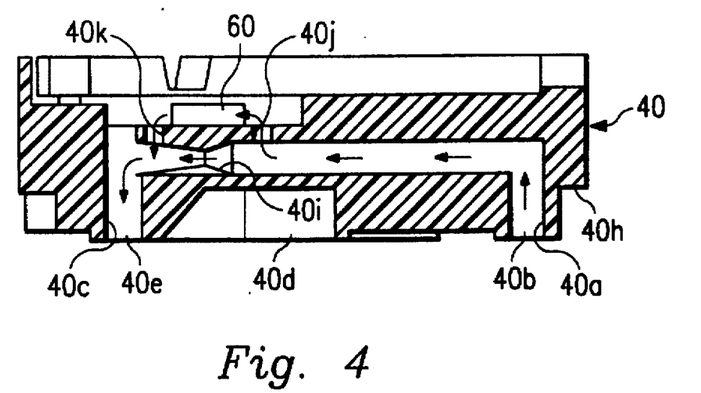
FIG. 4 is a sectional view taken along the line 4—4 of FIG. 3.

The particular structure of the member 40 that forms the above-mentioned passages and slots is better shown in FIG. 4. More particularly, as described above, the vapor flows from the vertical extended opening at the end of the slot 40*a*, through the horizontal passage 40*b*, and then downwardly through the vertical extended opening of the slot 40*c*. As shown, the ramp 40*e* forms a barrier to the flow of vapor from the slot 40*c* to the slot 40*d* unless one of the slots 50*i*–50*m* of the unit 50 (not shown in FIG. 4) extends over the ramp, as will be described.

A fluidic flowmeter 60, in the form of a negative fluidic feedback oscillator, is disposed in a section of the member 40 extending above the passage 40*b*, as viewed in FIG. 4, so that the vapor flow is metered as it passes through the member. To this end, the downstream portion of the passage 40*a* is reduced in cross section to form a venturi 40*i*, and two spaced through openings 40*j* and 40*k* are formed through a common wall of the member 40 extending between the passage 40*b* and the flowmeter 60. The openings 40*j* and 40*k* extend to either side of the venturi 40*i* so that a portion of the fluid flowing through the passage 40*b* is diverted into the opening 40*j* upstream of the venturi 40*i* and passes through the flowmeter 60 before returning, through the opening 40*k*, to the passage 40*b* at a location downstream of the venturi.

The flowmeter 60 is a conventional, oscillating-jet flowmeter for measuring the volumetric flow rate of fluid and is fully disclosed in U.S. Pat. No. 4,949,755 and 5,127,173 the disclosures of which is hereby incorporated by reference. Also, the specific technique of determining mass flow in a similar manner is disclosed in U.S. Pat. No. 4,508,127 the disclosure of which is also hereby incorporated by reference. In general, the flowmeter 60 consists of a fluid oscillator, a piezoceramic transducer, and an electrical connector. Although none of these components are shown in the instant drawings they will be described briefly as follows.

A portion of the vapor from the passage 40*b* passes through the opening 40*j* and enters the flowmeter 60 and a portion flows through the fluid oscillator, with the percentage of total flow which flows to the oscillator being determined by the ratio of oscillator nozzle throat area to the throat area of the venturi 40*i* in the passage 40*b*. Since this percentage is constant over the operating range of the flowmeter 60, the oscillator flow rate is an accurate indication of total flow. The fluid oscillator contains a nozzle which forms a jet of fluid which is directed across an open area toward the adjacent entrances of two feedback channels. Each feedback channel is connected to side ports which are directly opposed and located immediately downstream of the nozzle exit. Jet velocity is converted to static pressure at the entrance to the feedback channels and the latter are also connected to either side of a piezoceramic transducer that converts differential pressure fluctuations to an alternating voltage signal. As pressure rises in one feedback channel, increasing pressure at the corresponding side port deflects the jet away from the centerline. Pressure then begins to increase in the other feedback channel and the process repeats itself. The jet oscillates between the two feedback channels at a frequency determined by jet velocity and the piezoceramic transducer senses the frequency of the differential pressure fluctuations in the feedback channels and converts them to an electrical output signal. Oscillator flow is collected in the open area between the nozzle exit and the feedback channel entrances and is ported back, via the opening 40*k* to the venturi 40*i* where it rejoins the main flow in the passage 40*b*. A large percentage of the pressure drop from the flowmeter inlet to the venturi throat is recovered by the diffuser section of the venturi which minimizes the overall pressure drop of the flowmeter.

Thus, the continuous, self-induced oscillation is at a frequency that is proportional to the volumetric flow rate of the fluid and at an amplitude that is proportional to the mass flow rate. The output signal from the transducer sensor is conditioned into a scaled pulse output signal which is transmitted, via the cable 42, to the control unit 28.

The operation of the meter valve assembly 22 will be described with reference to FIGS. 5–8 of the drawings. (Since FIGS. 5–8 are bottom plan views, the various slots and ramps of the member 40 are shown in dashed lines). The assembly 22 is shown in its rest position in FIG. 5 with the pin 56 located at the end of the slot 40h. In this position, although the slot 50c of the unit 50 overlaps an end portion of the slot 40a of the member 40, there is no flow since the slot 50i, corresponding to the slot 50c, is out of alignment with the slots 40c and 40d.

Upon actuation of a dispensing unit, such as unit 20a (FIG. 1), for example, the motor 14 is actuated and the pump 12 pumps gasoline from the tank 10, through the gasoline flow meter 18 and through the dispensing nozzle associated with the unit 20a and into the vehicle tank. The gasoline flow is sensed by the meter 18 and a corresponding signal is sent to the control unit 28. A corresponding signal from the control unit 28 is sent to the motor 32 which is actuated to rotate the member 40 in a counter-clockwise direction relative to the unit 50, as viewed in FIG. 5, until the member 40 reaches the position relative to the unit 50 as shown in FIG. 6. In this position, the port 50c is fully aligned with the slot 40a and the slot 50i slightly overlaps the slots 40c and 40d and, more particularly, a portion of that portion of the ramp 40e extends between the slots 40c and 40d.

In the meantime, the gasoline entering the vehicle tank displaces a volume of gasoline vapor which rises to the filler neck of the tank and the motor 26 is actuated to drive the vapor pump 24 which assists in drawing the vapor from the vehicle tank, and passing it through the vapor recovery hose associated with the unit 20a, the tube 52a and to the inlet port 50c of the unit 50. The vapor then flows from the port 50c, through the slot 40a, the passage 40b and to the slot 40c. Limited vapor flow thus occurs from the slot 40c, across the relatively narrow passage provided by the slot 50i extending over the corresponding portion of the ramp 40e, and to the slot 40d. From the slot 40d, the vapor flows through the opening 50h of the unit 50 which registers with the slot 40d and therefore exits the assembly 22 and passes to the vapor pump 24, via the tube 54. During this mode, a portion of the fluid in the passage 40b is diverted through the opening 40j and passes through the flowmeter 60 before returning to the passage 40b. The flowmeter 60 sends control signals, via the cable 42, corresponding to the flow rate of the fluid to the control unit 28, as described above. The control unit 28 thus receives signals from the assembly 22 and from the gasoline flow meter 18, which signals are proportional to the vapor flow and the gasoline flow, respectively, through the actuated unit 20a. It is understood that the unit 28 has a microprocessor, or the like, to process these input signals and produce an output signal in accordance with the gasoline flow, the vapor flow and possibly other preselected parameters discussed above, which output signal is sent to the motor 32 to rotate the member 40, and thus control the vapor flow, accordingly. Assuming more vapor flow is needed, as determined by the control unit 28 in the above manner, further rotation of the member 40 in a counter-clockwise direction relative to the unit 50 continues until the member 40 reaches the position shown in FIG. 7. In this position maximum vapor flow is achieved since the port 50c is still fully aligned with the slot 40a and since the slot 50i completely bypasses that portion of the ramp 40e extending between the slots 40c and 40d. Thus, the vapor flows in the same manner as described in connection with the mode of FIG. 6, but at a higher rate. It is noted that the member 40 can rotate in both a clockwise direction relative to the unit 50 to decrease vapor flow and, of course, in a counter-clockwise direction to increase flow as determined by the control unit in the above manner.

Figure 5:
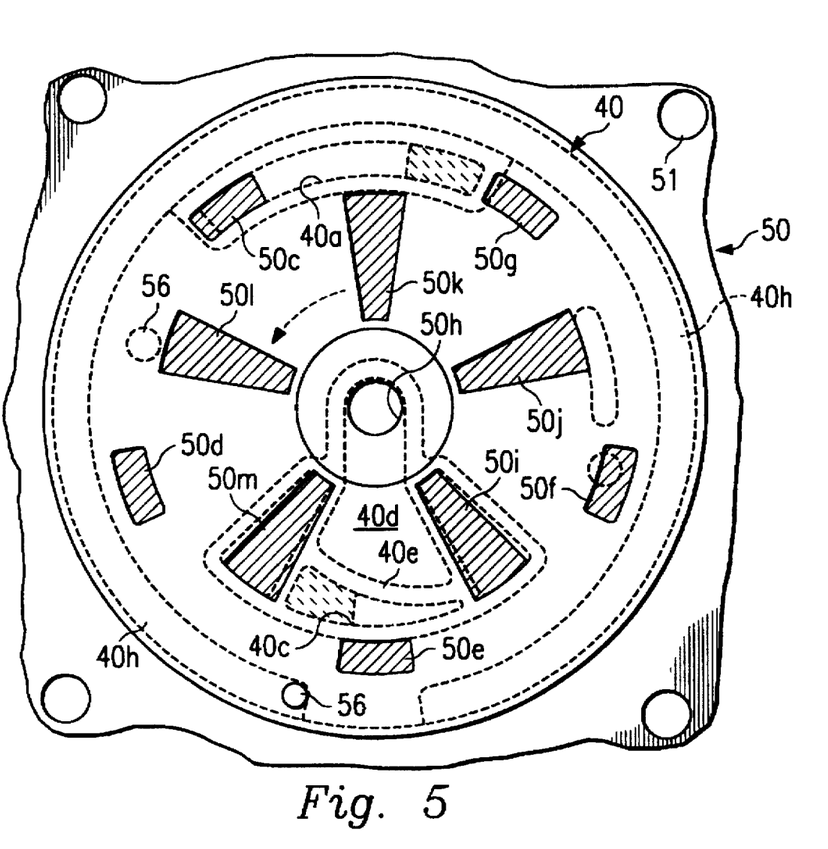
FIGS. 5–8 are bottom plan views depicting different operational modes of the meter/valve assembly of FIG. 2.
Figure 6:
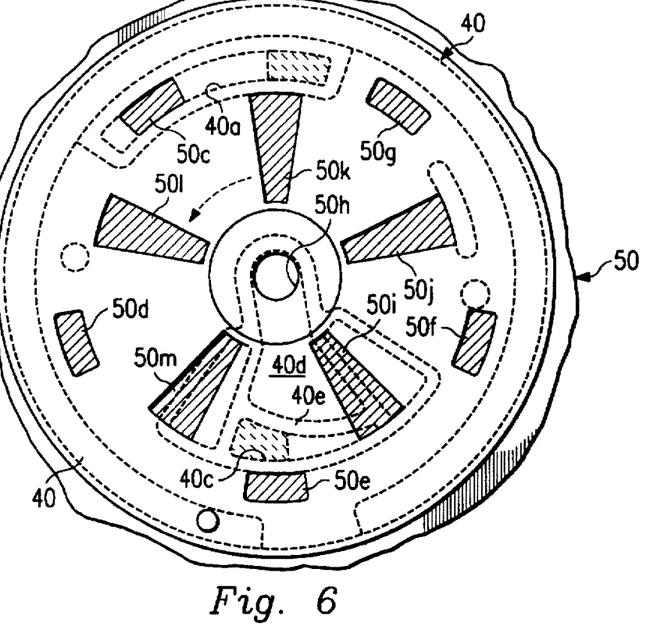

Once the dispensing nozzle associated with the unit 20a is shut off by the operator, or automatically in response to the filling of the vehicle tank, but before the nozzle is returned to the dispenser housing associated with the unit 20a, the control unit 28 actuates the motor 32 to move the member 40 in a clockwise relation relative to the unit 50 until the member 40 reaches a position between the positions shown in FIGS. 5 and 6, which is a standby mode. In this position, the slot 50i is out of alignment with the slots 40c and 40d, as well as the ramp 40e, so that the latter ramp thus blocks the flow of any vapor remaining in the assembly 22 from the slot 40c to the slot 40d. When the nozzle is then returned to the dispenser housing, an appropriate signal is then sent to the motor 32 from the control unit 28 which causes the motor to rotate the member 40 back to the starting position of FIG. 5 where it rests until another unit is actuated and the operation described above is repeated in connection with the particular unit 20a-20e that is actuated.

Of course, when another unit 20a-20e of the station 16a is later actuated, the member 40 is rotated to the position corresponding to the unit actuated. For example, if the nozzle associated with the unit 20b is removed from the dispenser housing, the member 40 would rotate to the position of FIG. 8, which is the standby position for unit 20b. In this position, the slot 50d, corresponding to the unit 20b, is located in alignment with the slot 40a; and the slot 50j, which also corresponds to the unit 20b, is located immediately adjacent the slots 40c and 40d and the ramp 40e extending between the latter slots. Upon actuation of the dispensing nozzle associated with the unit 20b, the operation of the assembly 22 then continues as described above in connection with the unit 20a When the dispensing nozzle associated with the unit 20b, or with any other unit 20c-20e, is shut off after use, and the nozzle returned to its dispensing station, and assuming the dispensing units associated with the station 16b are inactive, the member 40 is rotated in a clockwise direction to the position of FIG. 5 which also is the starting position for all of the units 20a-20e.

Figure 8:
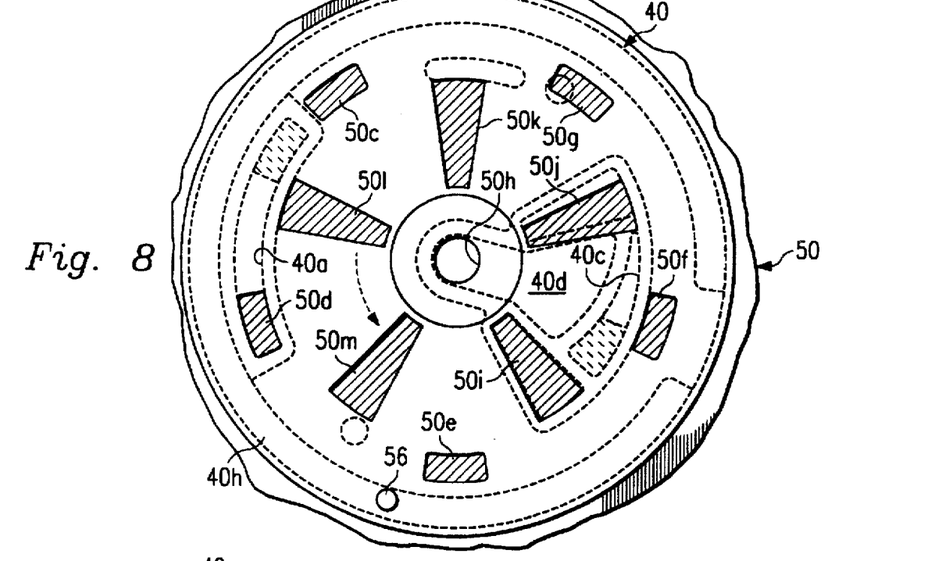

It is noted that when the member 40 is in the standby position of FIG. 8 as discussed above, if a dispensing unit associated with the station 16b is in use, the control unit 28 will not actuate the motor 32 to return the member 40 to the starting position of FIG. 5. Rather, the member 40 will remain in the standby position until the dispensing unit of the station 16b is put out of service or until another unit of the station 16a is actuated. This prevents the member 40 of the station 16a, during its return to the position of FIG. 5, from exposing the inlet port 50c to atmospheric air (through the various passages and slots in the members 40 and 50 discussed above) which air would be drawn into the apparatus by the vapor pump 24, since the latter is actuated during the operation of a dispensing unit of the station 16b. This is also true with respect to the standby positions corresponding to the units 20c-20e.

During all of the above-described rotation of the member 40 relative to the unit 50, the pin 56 rides in the slot 40h with the ends of the latter slot serving as mechanical stops to establish limits for the rotation of the member 40, and, in addition, establishes the initial position of the member 40 relative to the unit 50 in the event of a power failure, an error signal, or the like.

Figure 7:
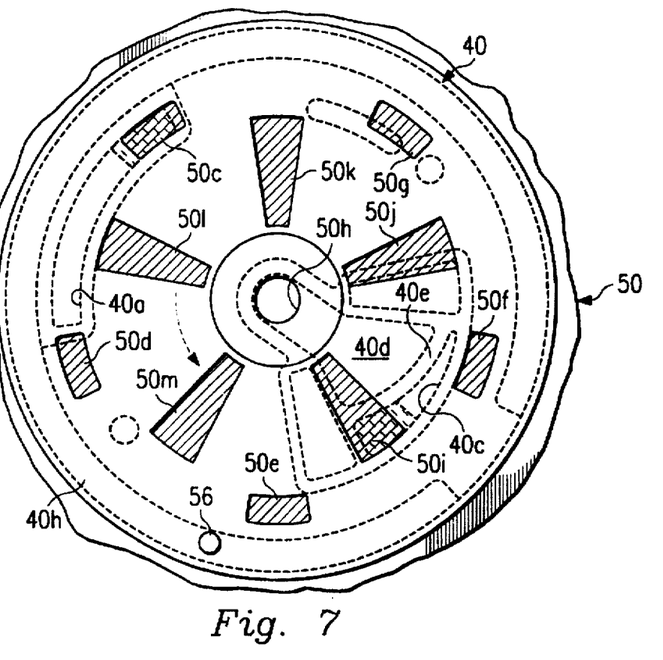
Figure 9:
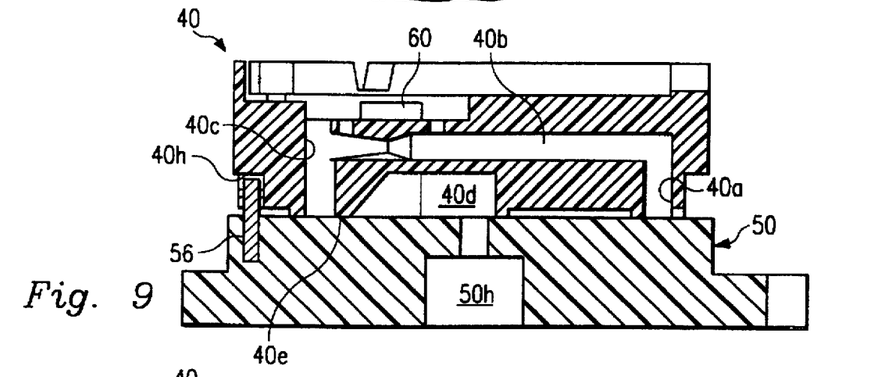
FIGS. 9 and 10 are sectional views of the meter valve assembly of FIG. 2.
Figure 10:
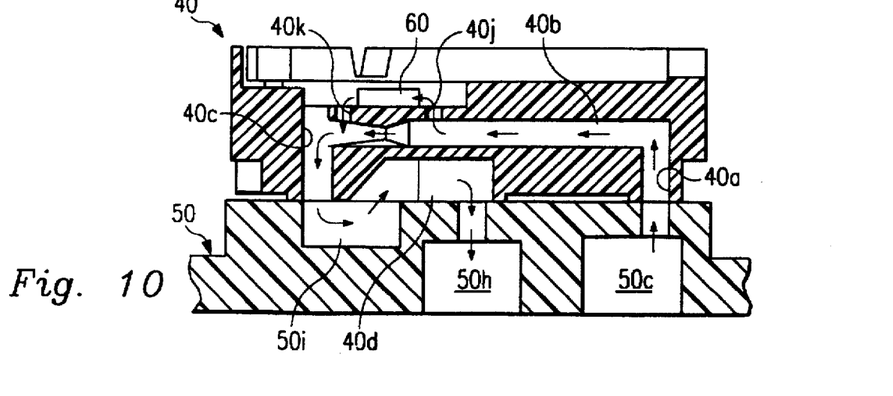

FIGS. 9 and 10 depict the structural relationship between the member 40 and the unit 50 in the fully closed position of FIG. 5 and the fully open position of FIG. 7, respectively, and more particularly the relationship between the various slots and openings in the units 40 and 50. In the fully blocked view of FIG. 9, the non-slotted surface of the unit 50 extends over the ramp 40e which thus prevents vapor flow from the slot 40c to the slot 40d. Upon rotation of the member 40 to the fully open position of FIG. 10, the slot 50i connects the slots 40c and 40d and thus enables vapor to flow over the ramp 40e, into and through the slot 40d and then exit the assembly 22, via the opening 50h.

In this manner, the return of vapor from the vehicle tank can be precisely controlled in response to the flow of gasoline to the tank. For example, the unit 28 can operate to control the vapor flow in the above manner so that it is proportional to the gasoline flow. Alternately, the vapor flow can be controlled taking into account one or more external factors, such as nozzle design, vehicle fill pipe design, weather conditions, wind, vehicle fuel tank temperature, fuel temperature, atmospheric pressure, etc.

Several other advantages result from the foregoing. For example, a single vapor pump 24 and a single meter/valve assembly 22 serve a plurality of dispensing units. Also, the vapor flow metering through the member 40 takes place upstream of the valve unit 50 so that the measurements of the former are not affected by any expansion of the vapor when it leaves the valve unit. Further, the provision of the ramps 40e on the surface of the member 40 results in a relatively low surface contact with the corresponding surface of the unit 50, thus reducing friction during the above-described rotation of the member 40.

It is understood that variations may be made in the foregoing without departing from the scope of the invention. For example, instead of one hose and nozzle assembly being associated with each dispensing unit 20a-20d as described above, a single hose and nozzle assembly can be provided with each dispensing station 16a and 16b along with valving to blend the gasoline from multiple storage tanks (if provided) and selectively direct the particular gasoline formulation to the single hose and nozzle dispenser. In this arrangement, the above-mentioned microprocessor would operate the assembly 22 in a manner so that only one of the inlet ports 50c-50g would be functional.

Also, the present invention is not limited to use with vapor recovery, but is equally applicable to other applications requiring the control of fluid from multiple locations. For example, it could be used in connection with the control of the flow of gasoline, or other fluids, from multiple sources, such as at a service station of the type described above. Further, the present invention is not limited to the particular flowmeter discussed above, but can also utilize other flowmeters, such as, for example, a flowmeter manufactured and distributed by the Moore Products Co., of Springhouse, Pa.

Further modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An apparatus for controlling the flow of vapor from a nozzle adapted to be inserted into a tank containing the vapor, the apparatus comprising a first unit having an inlet adapted to be connected to the nozzle and an opening, a second unit having an inlet and an outlet which are normally out of communication to prevent flow therethrough, drive means for moving one of the units relative to the other unit so that the inlet of the first unit registers with the inlet of the second unit and so that the opening of the first unit communicates the inlet of the second unit with the outlet of the second unit, and means for passing the vapor from the tank to the inlet of the first unit prior to passing through the inlet of the seconds unit, and then to the outlet of the second unit for discharge therefrom.

2. The apparatus of claim 1 wherein said drive means is adapted to move said one unit relative to said other unit to another position in which said opening of said first unit does not communicate said inlet and outlet of said second unit to prevent said flow.

3. The apparatus of claim 1 wherein said first unit has an outlet that communicates with said outlet of said second unit for receiving said discharged vapor therefrom.

4. The apparatus of claim 1 wherein there are a plurality of nozzles, and wherein said first unit has a plurality of inlets respectively corresponding to said nozzles and a plurality of openings respectively corresponding to said latter inlets.

5. The apparatus of claim 1 wherein the are a plurality of nozzles, and wherein the first unit has a plurality of inlets respectively corresponding to the nozzles and plurality of opening respectively corresponding to the latter inlets, and wherein said passing means comprises means for selectively passing gasoline through a nozzle into the tank to force the vapor to pass from the tank, through the nozzle, and the inlet of the first unit.

6. The apparatus of claim 1 wherein said inlet of said second unit is in the form of a slot which moves across said inlet of said first unit to vary said fluid flow depending on the relative position between said slot and said latter inlet.

7. The apparatus of claims 1 or 6 wherein said first and second units each are circular in cross-section and are coaxially disposed relative to each other, and wherein said one unit is rotated relative to said other unit.

8. The apparatus of claim 1 wherein said drive means moves said second unit relative to said first unit.

9. The apparatus of claim 1 or 5 further comprising a flowmeter associated with one of said units for metering said vapor flow, and control means associated with said flowmeter and responsive to said vapor flow for varying said movement to vary said fluid flow accordingly.

10. The apparatus of claim 1 wherein said second unit has a first passage extending from said inlet of said second unit and a second passage extending to said outlet of said second unit and an obstruction normally blocking flow from said first passage to said second passage, and wherein said opening of said first unit bypasses said obstruction and communicates with said passages to permit vapor flow through said passages.

11. The apparatus of claim 1 wherein said passing means comprises a vacuum pump connected to the first unit for drawing the vapor from the tank, through the nozzle, and to the inlet of the first unit.

12. The apparatus of claim 1 wherein the passing means comprises means for introducing a fluid into the tank to displace the vapor from the tank to the inlet of the first unit.

13. The apparatus of claim 1 further comprising means for introducing a fluid into the tank to displace the vapor from the tank to the inlet of the first unit.

14. The apparatus of claim 4 wherein the opening of said first unit corresponding to the inlet of said first unit registering with said inlet of said second unit communicates said inlet and outlet of said second unit.

15. The apparatus of claim 5, wherein said drive means is adapted to register said inlet of said second unit with an inlet of said first unit corresponding to the selected nozzle.

16. The apparatus of claim 9 wherein said control means varies said movement in response to the amount of gasoline passed into said tank.

17. The apparatus of claim 9 wherein said second unit has a passage connecting its inlet to its outlet and wherein said flowmeter is mounted in said second unit in a manner to receive at least a portion of the vapor flowing in said passage.

18. The apparatus of claims 9 wherein said flowmeter comprises a fluidic feedback oscillator and further comprising means associated with said oscillator for generating an output signal corresponding to said fluid flow.

19. The apparatus of claim 10 wherein said obstruction is a partition extending between said passages and wherein said opening of said first unit extends from said first passage, around said partition said second passage.

20. A method for processing the flow of vapor from one or more nozzles adapted to be inserted into a tank containing the vapor, the method comprising the steps of connecting the nozzles to corresponding inlets of a first unit and a second unit having and inlet and establishing relative rotation between the first unit and a second unit having an inlet and an outlet which are normally out of communication to prevent flow therethrough, and controlling the relative rotation in response to predetermined vapor flow-related information so that one of the inlets of the first unit registers with the inlet of the second unit and so that the opening of the first unit communicates the inlet of the second unit with the outlet of the second unit, and passing the vapor from the one inlet of the first unit, through the inlet of the second unit, and to the outlet of the second unit for discharge therefrom.

21. The method of claim 20 wherein said one unit is adapted to rotate relative to said other unit to another position in which said opening of said first unit does not communicate said inlet of said second unit to prevent said flow.

22. The method of claim 20 wherein said first unit has an outlet that communicated with said outlet of said second unit for receiving said discharged vapor therefrom.

23. The method of claim 22 wherein there are a plurality of sources, and wherein said first unit has a plurality of inlets respectively corresponding to said sources and a plurality of openings respectively corresponding to said latter inlets.

24. The method of claim 23 wherein the opening of said first unit corresponding to the inlet of said first unit registering with said inlet of said second unit communicates said inlet and outlet of said second unit.

25. The method of claim 20 wherein there are a plurality of nozzles, and wherein the first unit has a plurality of inlets respectively corresponding to the nozzles and a plurality of openings respectively corresponding to the latter inlets, and wherein the step of passing comprises the step of introducing gasoline through the nozzles and into the tank to force the vapor to pass from the tank, through the nozzles, and to the inlet of the first unit.

26. The method of claim 25, wherein said step of controlling registers said inlet of said second unit with an inlet of said first unit corresponding to the selected nozzle.

27. The method of claim 20 wherein said inlet of said second unit is in the form of a slot and wherein said step of controlling causes said slot to move across said, inlet of said first unit to vary said vapor flow depending on the relative position between said slot and said inlet.

28. The method of claim 20 or 26 wherein said first and second units each are circular in cross-section and are coaxially disposed relative to each other, and wherein said step of establishing causes said one unit to be rotated relative to said other unit.

29. The method of claim 20 wherein said step of establishing causes said second unit to move relative to said first unit.

30. The method of claim 20 or 25 further comprising the steps of metering said vapor flow and varying said rotation in response to the metered fluid flow to vary said vapor flow accordingly.

31. The method of claim 30 wherein said step of controlling varies said rotation in response to the amount of gasoline passed into said tank.

32. The method of claim 30 further comprising the step of generating and output signal corresponding to said vapor flow, said relative rotation being controlled in response to said output signal.

33. The method of claim 20 wherein said second unit has a first passage extending from said inlet of said second unit and a second passage extending to said outlet of said second unit and an obstruction normally blocking flow from said first passage to said second passage, and wherein, in response to said step of establishing, said opening of said first unit bypasses said obstruction and communicates with said passages to permit vapor flow through said passages.

34. The method of claim 20 wherein the step of passing comprises the step of connecting the first unit to a vacuum pump for drawing the vapor from the tank, through the nozzle, and the inlet of the first unit.

35. The method of claim 20 wherein the step of passing comprises the step of introducing a fluid into the tank to displace the vapor from the tank to the inlet of the first unit.

36. A method for processing the flow of fluid from one or more sources, the method comprising the steps of connecting the sources to corresponding inlets of a first unit having at least one opening, establishing relative rotation between the first unit and a second unit having an inlet and an outlet which are normally out of communication to prevent flow therethrough, metering the fluid flow, and controlling the relative rotation in response to the metering so that one of the inlets of the first unit registers with the inlet of the second unit and so that the opening of the first unit communicates the inlet of the second unit with the outlet of the second unit to permit fluid flow from the one inlet of the first unit, through the inlet of the second unit, and to the outlet of the second unit for discharge therefrom.

37. The method of claim 36 wherein the one unit is adapted to move relative to the other unit to another position in which the opening of the first unit does not communicate the inlet and outlet of the second unit to prevent the flow.

38. The method of claim 36 wherein the first unit has an outlet that communicates with the outlet of the second unit for receiving the discharged fluid therefrom.

39. The method claim 36 wherein the fluid is vapor and each source is a nozzle adapted to be inserted into a tank containing the vapor, and further comprising the step of drawing the vapor from the tank and through the nozzles.

40. The method of claim 36 wherein the inlet of the second unit is in the form of a slot and wherein the step of controlling causes the slot to move across the inlet of the first unit to vary the fluid flow depending on the relative position between the slot and the inlet.

41. The method of claims 36 wherein the first and second units each are circular in cross-section and are coaxially disposed relative to each other, and wherein the step of establishing causes the one unit to be rotated relative to the other unit.

42. The method of claim 36 wherein the step of establishing causes the second unit to rotate relative to the first unit.

43. The method of claim 36 wherein the step of controlling varies the rotation in response to the amount of gasoline passed into the tank.

44. The method of claim 36 further comprising the step of generating an output signal corresponding to the fluid flow, the relative rotation being controlled in response to the output signal.

45. The method of claim 36 wherein the second unit has a first passage extending from the inlet of the second unit and a second passage extending to the outlet of the second unit and an obstruction normally blocking flow from the first passage to the second passage, and wherein, in response to the step of establishing, the opening of the first unit bypasses the obstruction and communicates with the passages to permit fluid flow through the passages.

46. The method of claim 38 further comprising the step of connecting the outlet of the first unit to a vacuum pump for promoting the fluid flow.

47. The method of claim 38 wherein there are a plurality of sources, and wherein the first unit has a plurality of inlets respectively corresponding to the sources and a plurality of openings respectively corresponding to the latter inlets.

48. The method of claim 47 wherein the opening of the first unit corresponding to the inlet of the first unit registering with the inlet of the second unit communicates the inlet and outlet of the second unit.

49. The method of claim 36 wherein there are a plurality of nozzles, and wherein the first unit has a plurality of inlets respectively corresponding to the nozzles, and a plurality of openings respectively corresponding to the latter inlets, and further comprising the step of selectively passing gasoline through the nozzles and into the tank.

50. The method of claim 49 wherein the step of controlling registers the inlet of the second unit with an inlet of the first unit corresponding to the selected nozzle.

51. An apparatus for controlling the flow of fluid from one or more sources, the apparatus comprising a first unit having a number of inlets respectively connected to the sources and at least one opening; a second unit having an inlet and an outlet which are normally out of communication to prevent flow therethrough; drive means for moving one of the units relative to the other unit so that one of the inlets of the first unit registers with the inlet of the second unit and so that the opening of the first unit communicates the inlet of the second unit with the outlet of the second unit to permit fluid flow from the one inlet of the first unit, prior to passing through the inlet of the second unit, and then to the outlet of the second unit for discharge therefrom; a flowmeter associated with one of the units for metering the fluid flow; and control means associated with the flowmeter and the drive means and responsive to the fluid flow for varying the movement to vary the fluid flow accordingly.

52. The apparatus of claim 51 wherein the drive means is adapted to move the one unit relative to the other unit to another position in which the opening of the first unit does not communicate the inlet and outlet of the second unit to prevent the flow.

53. The apparatus of claim 51 wherein the first unit has an outlet that communicates with the outlet of the second unit for receiving the discharged fluid therefrom.

54. The apparatus of claim 51 wherein there are a plurality of sources, and wherein the first unit has a plurality of inlets respectively corresponding to the sources and a plurality of openings respectively corresponding to the latter inlets.

55. The apparatus of claim 51 wherein the first unit has a plurality of inlets respectively corresponding to the sources and a plurality of openings respectively corresponding to the latter inlets, and further comprising means for selectively passing gasoline through the sources and into the tank.

56. The apparatus of claim 51 wherein the inlet of the second unit is in the form of a slot which moves across the inlet of the first unit to vary the fluid flow depending on the relative position between the slot and the latter inlet.

57. The apparatus of claim 51 wherein the first and second units each are circular in cross-section and are coaxially disposed relative to each other, and wherein the one unit is rotated relative to the other unit.

58. The apparatus of claim 51 wherein the second unit has a passage connecting its inlet to its outlet and wherein the flowmeter is mounted in the second unit in a manner to receive at least a portion of the fluid flowing in the passage.

59. The apparatus of claim 51 wherein the second unit has a first passage extending from the inlet of the second unit and a second passage extending to the outlet of the second unit and an obstruction normally blocking flow from the first passage to the second passage, and wherein the opening of the first unit bypasses the obstruction and communicates with the passages to permit fluid flow through the passages.

60. The apparatus of claim 51 further comprising a vacuum pump connected to the first unit for drawing the vapor from the tank, through the nozzel, and to the inlet of the first unit.

61. The apparatus of claim 54 wherein the opening of the first unit corresponding to the inlet of the first unit communicates the inlet and outlet of the second unit.

62. The apparatus of claim 55 wherein the drive means is adapted to register the inlet of the second unit with an inlet of the first unit corresponding to the selected source.

63. The apparatus of claim 55 wherein the control means varies the movement in response to the amount of gasoline passed into the tank.

64. The apparatus of claim 58 wherein the flowmeter comprises a fluidic feedback oscillator and further comprising means associated with the oscillator for generating an output signal corresponding to the fluid flow.

65. The apparatus of claim 59 wherein the obstruction is a partition extending between the passage and wherein the opening of the first unit extends from the first passage, around the partition and the second passage.

* * * * *